United States Patent [19]

Kendall et al.

[11] Patent Number: 4,809,672
[45] Date of Patent: Mar. 7, 1989

[54] GAS-FIRED BAYONET-TYPE HEATER

[75] Inventors: Robert M. Kendall, Sunnyvale; Jeffrey M. Kennedy, Boulder Creek; Andrew C. Minden, San Jose; Richard K. Tidball, Fremont, all of Calif.

[73] Assignee: Alzeta Corporation, Santa Clara, Calif.

[21] Appl. No.: 107,558

[22] Filed: Oct. 13, 1987

[51] Int. Cl.⁴ .................................................. F24C 3/00
[52] U.S. Cl. ...................................... 126/91 A; 431/328
[58] Field of Search ....................... 431/328; 126/91 A

[56] References Cited

U.S. PATENT DOCUMENTS 3,285,240 11/1966 Schmidt .............................. 126/91 A
3,771,945 11/1973 Teague ................................ 431/328
4,252,520 2/1981 Bratko ................................. 431/328
4,400,152 8/1983 Craig et al. ......................... 431/328

Primary Examiner—Carroll B. Dority, Jr.
Attorney, Agent, or Firm—Paul W. Garbo

[57] ABSTRACT

An efficient gas-fired bayonet-type heater has been developed to challenge the dominant position long enjoyed by the electric bayonet-type heater. The new heater replaces the electric resistance element in the bayonet-type heat exchange shell with a tubular porous fiber burner having a high length-to-diameter ratio attached to a long feed tube for the gas-air mixture. An annular space around the burner and feed tube within the shell provides the path for the combustion gases to flow to a discharge opening near the entry point of the gas-air mixture.

12 Claims, 1 Drawing Sheet

GAS-FIRED BAYONET-TYPE HEATER

BACKGROUND OF THE INVENTION

This invention relates to bayonet-type heaters containing gas burners of long length and relatively small transverse section. More particularly, the heaters of this invention have a tubular heat exchange shell encasing a tubular porous fiber burner attached to a long feed tube for the fuel gas-air mixture.

Electric bayonet-type heaters have long enjoyed diverse applications such as domestic water heaters, commercial food cookers, and air or gas heaters. Because of the compactness of electric bayonet-type heaters, it has not been possible heretofore to use gas burners in lieu of the electric resistance elements commonly employed in bayonet-type heaters. Of course, there is a substantial economic advantage in generating heat with fuel gas rather than with electricity. In many places, the cost of heat from electricity is at least two to three times the cost of heat from fuel gas such as natural gas. Hence, there has long been a need for a gas burner capable of being substituted for electric resistance elements in bayonet-type heaters.

A principal object of this invention is to provide a simple gas burner which can be inserted in the casing of a bayonet-type heater and operated to deliver heat efficiently through the casing to the medium in contact therewith.

Another important object is to provide a tubular porous fiber burner of small diameter attached to a long gas-air feed tube so that the gaseous products of combustion will flow through the annular space between the burner and the bayonet-type casing counter to the flow of the fuel gas-air stream fed to the burner.

These and other objects and advantages of the invention will be evident from the description which follows.

SUMMARY OF THE INVENTION

In accordance with this invention, a novel gas-fired bayonet-type heater comprises a metal tubular casing with one end closed, hereinafter called the heat exchange shell, a tubular porous fiber burner aligned with, and attached to, a long feed tube for the fuel gas-air mixture, the burner and feed tube being disposed within, but not in contact with, the heat exchange shell, a removable seal plate with the feed tube extending therethrough fastened across the open end of the heat exchange shell, and an opening in the shell adjacent to its open end for the discharge of combustion products. Preferably, the heat exchange shell, the burner and feed tube are cylindrical, and the burner with the aligned feed tube is concentrically positioned in the shell so that there is a uniform annular space between the inner surface of the shell and the outer surface of the burner and feed tube. The portion of the feed tube within the heat exchange shell has a length generally in the range of about 50% to 150%, preferably at least 100%, of the burner length. For the compact bayonet-type heater of this invention, the outside diameter of the porous fiber burner is a small fraction of its length and is often in the range of about 0.5 to 6 inches. An unusual feature of the burner is its large length-to-diameter ratio of at least 8, preferably in the range of about 10 to 20.

The production of porous fiber burners has been described, e.g., in U.S. Pats. Nos. 3,275,497 and 3,383,159. Basically, these burners are formed by depositing and cementing a porous layer of chopped ceramic fibers on the surface of a metal screen. The fuel gas and air mixture fed to such a burner passes through the screen and porous fiber layer and burns on the exposed surface of that fiber layer which incandesces and emits up to about half of the combustion heat as infrared radiation.

Inasmuch as the porous fiber burner is disposed in the heat exchange shell close to its closed end, the gaseous combustion products flow through the annular space surrounding the burner and feed tube countercurrent to the flow of fuel gas and air passing through the feed tube and into the burner. The portion of the heat exchange shell directly facing the incandescent burner surface is uniformly heated principally by infrared radation while the remainder of the shell facing the feed tube is uniformly heated convectively by the flow of hot combustion gases along the inner surface of the shell. To enhance convection from the hot gases to the shell, it is advisable to provide spaced, longitudinal metal fins which are attached to the inner surface of the shell and do not contact the feed tube.

Because of the excellent transfer of heat by infrared radiation from the incandescent surface of the porous fiber burner which generally has a temperature of about 1850° F. to the portion of the shell facing the burner followed by convection from the hot combustion gases to the portion of the shell facing the long feed tube, at least 70% of the higher heating value of the fuel gas is passed by the heat exchange shell to the fluid, gaseous or liquid, which is in contact with the outer surface of the shell. The bayonet-type heater of this invention can be designed to supply at least 80% of the higher heating value of the fuel gas to the fluid in which the heater is immersed. In most cases, the combustion gases discharged from the heater will be at a temperature in the range of 500° to 700° F.

BRIEF DESCRIPTION OF THE DRAWINGS

To facilitate the further description and understanding of the invention, reference will be made to the accompanying drawings of which.

DESCRIPTION OF PREFERRED EMBODIMENTS

Figure 1:
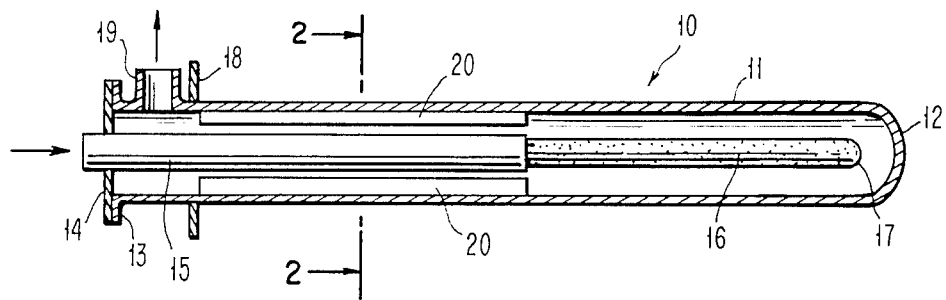
FIG. 1 is an axial section through the heat exchange shell but not the internals of an illustrative heater of this invention.
Figure 2:
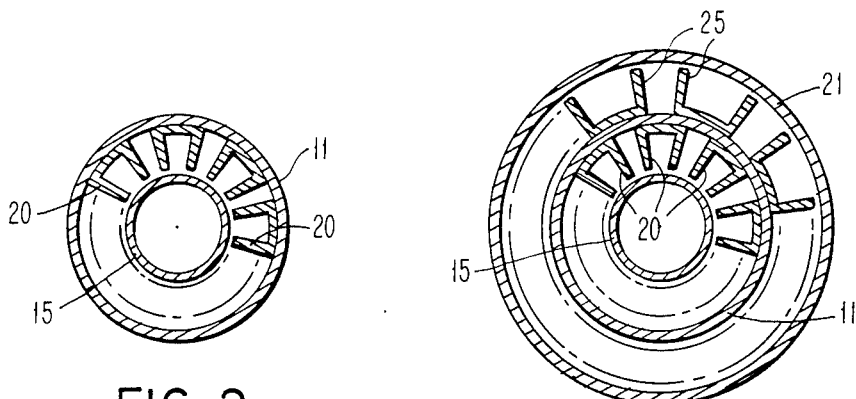
FIG. 2 is an enlarged sectional view taken along the line 2-2 of FIG. 1.

The novel gas-fired bayonet-type heater 10 of FIG. 1 has heat exchange shell 11 with closed end 12 and flange 13 attached to its open end. Seal plate 14 is bolted to flange 13 and supports feed tube 15 which passes through plate 14 by way of a threaded or welded joint. Aligned with, and attached to, feed tube 15 is porous fiber burner 16. End 17 of burner 16 may also be part of the screen with a porous layer of ceramic fibers which forms burner 16. Alternatively, end 17 may be an impervious plug. Shell 11 has mounting flange 18 welded thereto near end flange 13. In the usual installation of heater 10, shell 11 is inserted into a vessel through a hole in its wall slightly larger than the outside diameter of shell 11; mounting flange 18 is then fastened to the vessel wall to seal the hole and hold heater 10 in place. Between end flange 13 and mounting flange 18, shell 11 is provided with opening 19 for the discharge of combustion gases. To improve convection from the hot combustion gases to the portion of shell 11 facing feed tube 15, it is preferable to have longitudinal metal fine fins 20 attached to the inner surface of that portion of shall 11. As shown in FIG. 2, fins 20 may be in the form of U-shaped channels uniformly spaced from one another and axially aligned. The transverse dimension of longitudinal fins 20 is slightly less than the width of the annular space between shell 11 and feed tube 15 so that fins 20 do not contact tube 15.

In operation, a mixture of fuel gas such as natural gas and air in an amount not more than about 15% in excess of the stoichiometric requirement is supplied through feed tube 15 to porous fiber burner 16. A spark or like igniter (not shown) in shell 11 near burner 16 ignites the gas-air mixture reaching the outer surface of porous fiber burner 16 and results in surface combustion so that all of burner 16 radiates infrared energy to shell 11. The hot combustion gases flow countercurrent to the flow of the gas-air mixture within feed tube 15 and burner 16. Inasmuch as the annular space around tube 15 and burner 16 has a narrow width, the hot combustion gases flow at high velocity to discharge opening 19 and thereby achieve good heat transfer to shell 11. A small fraction of the heat in the combustion gases passes through tube 15 and becomes preheat of the gas-air mixture fed to burner 16.

In addition to its compactness, the gas-fired heater 10 achieves high thermal efficiency, operates at a low noise level, and yields combustion products with remarkably small proportions of CO, $NO_x$ and unburned hydrocarbons. Satisfactory performance of the porous fiber burner is attained with excess air in the range of about 10% to 50%. The resulting combustion gases will contain on a volume basis not more than about 50 ppm (parts per million) of CO, not more than about 20 ppm $NO_x$ and not more than about 5 ppm of unburned hydrocarbons. These outstanding features of the gas-fired heater of this invention supplement its economic advantage as a desirable substitute or replacement for bayonet-type electric heaters.

Figure 3:
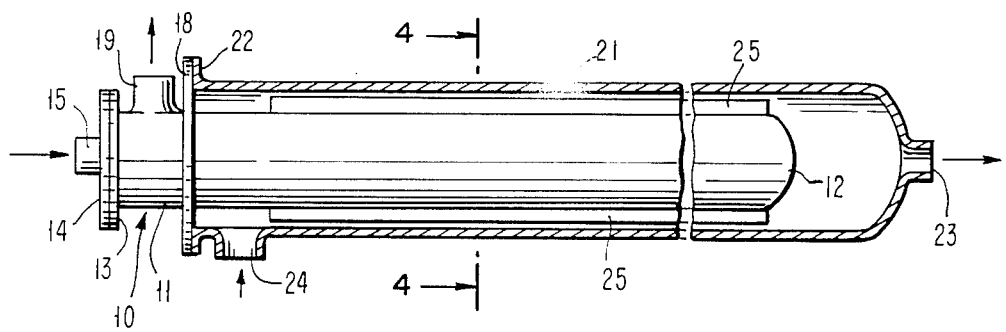
FIG. 3 is an axial section of a tubular vessel in which the heater of FIG. 1 has been installed.

FIG. 3 shows an axial section of tubular vessel 21 one end of which has flange 22 so that mounting flange 18 of heater 10 can be bolted thereto. The opposite end of vessel 21 has axial opening 23 while a radial or lateral opening 24 is provided close to flange 22. Metal axial fins 25 (only two shown in FIG. 3) are uniformly spaced around and fastened to the exterior of heat exchange shell 11 and extend from closed end 12 to a point short of overlapping lateral opening 24 in tubular vessel 21. Fins 25 have a radial dimension slightly less than the width of the annular space between shell 11 and vessel 21 so that they do not contact vessel 21.

Figure 4:
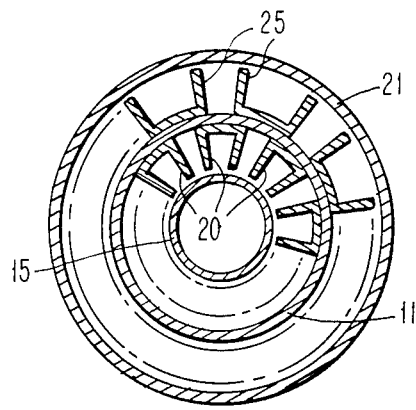
FIG. 4 is an enlarged sectional view taken along the line 4-4 of FIG. 3.

FIG. 4 shows that the convective portion of shell 11 has in this installation both internal fins 20 and external fins 25 to enhance the transfer of heat from hot combustion gases flowing along fins 20 to a fluid, liquid or gaseous, passed through vessel 21 along fins 25. Inasmuch as the combustion gases flow toward the left in FIG. 3 in order to discharge from heater 10 through opening 19, it is preferable to pass the fluid which is to be heated in the counter direction by introducing it into vessel 21 through lateral opening 24 and withdrawing the heated fluid through axial opening 23.

In a specific example of the apparatus shown in FIG. 3 and FIG. 4, tubular vessel 21 is 88 inches long and and has an 8-inch inside diameter. Heat echange shell 11 has a 5-inch inside diameter and length of 78 inches measured from mounting flange 18. Porous fiber burner 16 has an outside diameter of 2.75 inches and a 36-inch length while feed tube 15 has an outside diameter of 3 inches. Sixteen U-shaped fins 25 are uniformly spaced around, and attached to, the outer surface of shell 11 and twenty-four U-shaped fins 20 are uniformly spaced from one another and attached to the inner surface of shell 11. The length of internal fins 20 is 38 inches and that of external fins 25 is 68 inches. Fins 20 and fins 25 have radial dimensions which are about 90% of the widths of the respective annuli in which they are positioned. The length-to-diameter ratio of burner 16 is 13.

Using that specific apparatus to heat air supplied to tubular vessel 21 through opening 24 at a temperature of 135° F. and at the rate of 25,500 standard cubic feet per hour, natural gas with a higher heating value of 1000 BTU per standard cubic foot is fed to tube 15 at the rate of 172 standard cubic feet per hour together with air which is 15% in excess of the stoichiometric requirement. Heated air issues from opening 23 of vessel 21 at a temperature of 365° F. while combustion gases leave shell 11 through opening 19 at a temperature of about 550° F. Approximately 80% of the higer heating value of the natural gas is thus utilized to heat the air passing through vessel 21. This notable performance is even more unexpected in view of the very low content of noxious emissions in the combustion gases, which in volume parts per million are 21 for CO, 11 for $NO_x$ and 5 for unburned hydrocarbons. Depending on the costs of electricity and fuel gas in different areas of the country, the cost of heating air in the foregoing example with fuel gas will in most cases be not more than 50% of the cost of heating with electricity and may be as little as 20% of the cost of electrical heating.

Modifications and variations of the gas-fired, bayonet-type heater of this invention will be apparent to those skilled in the art without departing from the spirit and scope of the invention. For instance, in lieu of brazing or otherwise attaching fins 20 to shell 11, an equivalent structure may be produced by metal extrusion. When the transverse section of the burner is not circular (e.g., elliptical), the length-to-diameter ratio in such case shall mean the ratio of the burner's length to the maximum dimension of its transverse section.

Furthermore, while FIG. 3 illustrates an important use of the heater of this invention, the heater also finds broad application in large tanks containing liquid. Such a tank may be equipped with several heaters. In fact, electrical resistance heaters with the heating elements protected by a metal sheath and having a compact, bayonet-type configuration have long enjoyed broad use in liquid tanks. These electrical heaters, which heretofore have had no significant competition from gasfired heaters, are frequently called flanged immersion heaters. These immersion heaters are offered with standard flange sizes which match flanges on the sides of liquid tanks. Flange 18 of the heater of FIG. 1 can also be provided in the same sizes so that the replacement of flanged electrical immersion heaters by flanged gasfired heaters is not only simple but also economically attractive. When one or more heaters of the type shown in FIG. 1 are used in a liquid tank, they may have exterior fins, e.g., in the form of metal disks uniformly spaced along the length of shell 11. Accordingly, only such limitations should be imposed on the invention as are set forth in the appended claims.

What is claimed is:

1. A gas-fired bayonet-type heater comprising a tubular heat exchange shell with a closed end, a tubular porous fiber burner aligned with, and attached to, a fuel gas-air mixture feed tube disposed within, and annularly spaced from, said shell, said burner having a length-to-diameter ratio of at least 8 and the length of said feed tube within said shell being at least 50% of the length of the said burner, a removable seal plate with said feed tube extending therethrough fastened across the open end of said shell, and an opening in said shell adjacent said open end for the discharge of combustion products.

2. The heater of claim 1 wherein longitudinal fins project from the inner surface of the heat exchange shell toward the feed tube within said shell.

3. The heater of claim 1 wherein the porous fiber burner is cylindrical and has an outside diameter in the range of 0.5 to 6 inches.

4. The heater of claim 3 wherein the porous fiber burner has a length-to-diameter ratio in the range of about 10 to 20.

5. The heater of claim 3 wherein longitudinal fins project from the inner surface of the heat exchange shell toward the feed tube within said shell but not more than about 90% of the width of the annular space between said shell and said feed tube.

6. The heater of claim 2 wherein longitudinal fins project outwardly from the outer surface of the heat exchange shell and extend from the closed end of said shell to a point near the opening in said shell for the discharge of combustion products.

7. The heater of claim 1 wherein the porous fiber burner has a length-to-diameter ratio in the range of about 10 to 20 and the length of the feed tube within the heat exchange shell is at least 100% of the length of said burner.

8. The heater of claim 7 wherein the diameter of porous fiber burner is in the range of 0.5 to 6 inches.

9. The heater of claim 8 wherein longitudinal fins project from the inner surface of the heat exchange shell toward the feed tube within said shell.

10. The heater of claim 8 wherein longitudinal fins project outwardly from the otuer surface of the heat exchange shell and extend from the closed end of said shell to a point near the opening in said shell for the discharge of combustion products.

11. The heater of claim 7 wherein longitudinal fins project from the inner surface of the heat exchange shell toward the feed tube within said shell but not more than about 90% of the width of the annular space between said shell and said feed tube, and longitudinal fins project outwardly from the outer surface of said shell and extend from the closed and of said shell to a point near the opening in said shell for the discharge of combustion products.

12. The heater of claim 11 wherein the porous fiber burner has an outside diameter in the range of 0.5 to 6 inches.

* * * * *